US008692904B2

(12) United States Patent
Maruyama

(10) Patent No.: US 8,692,904 B2
(45) Date of Patent: Apr. 8, 2014

(54) IMAGE PICKUP APPARATUS HAVING MASKING FUNCTION

(75) Inventor: Naoki Maruyama, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 207 days.

(21) Appl. No.: 13/038,652

(22) Filed: Mar. 2, 2011

(65) Prior Publication Data

US 2011/0228119 A1 Sep. 22, 2011

(30) Foreign Application Priority Data

Mar. 18, 2010 (JP) ................................. 2010-062057

(51) Int. Cl.
*H04N 9/73* (2006.01)
*H04N 5/232* (2006.01)

(52) U.S. Cl.
USPC .................... 348/223.1; 348/345; 348/143

(58) Field of Classification Search
USPC ............ 348/223.1, 345, 354–356, 143, 222.1
See application file for complete search history.

(56) References Cited

U.S. PATENT DOCUMENTS

| 6,744,461 | B1 * | 6/2004 | Wada et al. ................... 348/143 |
| 7,508,415 | B2 * | 3/2009 | Seo ............................ 348/208.3 |
| 8,223,214 | B2 * | 7/2012 | Toguchi ........................ 348/143 |
| 8,253,812 | B2 * | 8/2012 | Kurokawa ................... 348/208.4 |
| 2007/0115356 | A1 * | 5/2007 | Kang et al. .................... 348/143 |
| 2008/0055409 | A1 * | 3/2008 | Mars et al. .................... 348/143 |

FOREIGN PATENT DOCUMENTS

| JP | 2001-069494 A | | 3/2001 | |
| JP | 2003-259189 | * | 9/2003 | ............ H04N 5/232 |
| JP | 2003-259189 A | | 9/2003 | |
| JP | 2004-40162 | * | 2/2004 | |
| JP | 2004-040162 A | | 2/2004 | |

* cited by examiner

*Primary Examiner* — Nhan T Tran
(74) *Attorney, Agent, or Firm* — Fitzpatrick, Cella, Harper & Scinto

(57) ABSTRACT

An image pickup apparatus includes adjustment processors 15, 16, and 18 that sets an evaluation area 106 in an image generated by taking the image and that perform a focusing process or a color adjustment process based on evaluation information obtained from an image signal of the evaluation area, and a masking processor 17 that sets a mask area 302 in the image and perform a masking process for the mask area. The adjustment processors change at least one of a position and a size of the evaluation area so that a range in which the evaluation area is not overlapped with the mask area increases when at least a part of the evaluation area is overlapped with the mask area.

12 Claims, 10 Drawing Sheets

IMAGE PICKUP APPARATUS HAVING MASKING FUNCTION

BACKGROUND OF THE INVENTION

1. Field of the Invention

The present invention relates to an image pickup apparatus such as a surveillance camera that has a function of performing a masking process with respect to a specific area in a shot image.

2. Description of the Related Art

A camera that is used for a monitoring application may continuously take images around a public place or a specific building and also the image taken by the camera may include a specific object that should not be displayed in view of a privacy or an information management in many cases.

Therefore, Japanese Patent Laid-Open No. 2001-069494 discloses a surveillance camera capable of performing a masking process for an area where a specific object has been taken in a shot image. Japanese Patent Laid-Open No. 2004-040162 discloses a television camera capable of specifying a mask area for which the masking process should be performed by a touch panel method.

However, when the surveillance camera has an autofocus (AF) function or an automatic color adjustment (AWB) function, there may be a case where an evaluation area in which an evaluation value used for the AF or the AWB in the shot image is obtained is overlapped with a mask area. In this case, the AF is performed for an object for which the masking has been performed or the AWB is performed based on the area for which the masking has been performed, and an output image in which an area other than the mask area to be displayed is blurred or a color is unnatural is obtained.

SUMMARY OF THE INVENTION

An image pickup apparatus as one aspect of the present invention includes an adjustment processor configured to set an evaluation area in an image generated by taking the image and perform a focusing process or a color adjustment process based on evaluation information obtained from an image signal of the evaluation area, and a masking processor configured to set a mask area in the image and perform a masking process for the mask area. The adjustment processor changes at least one of a position and a size of the evaluation area so that a range in which the evaluation area is not overlapped with the mask area increases when at least a part of the evaluation area is overlapped with the mask area.

Further features and aspects of the present invention will become apparent from the following description of exemplary embodiments with reference to the attached drawings.

DESCRIPTION OF THE PREFERRED EMBODIMENTS

Exemplary embodiments of the present invention will hereinafter be described with reference to the accompanying drawings.

Embodiment 1

Figure 1:
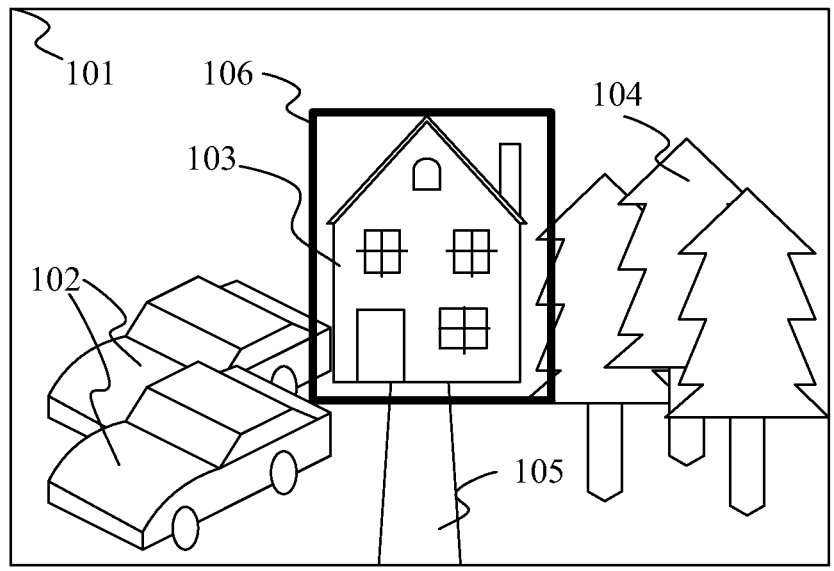
FIG. 1 is a view illustrating an example of a shot image generated by a camera that is Embodiment 1 of the present invention.

FIG. 1 illustrates a shot image generated by taking an image using a surveillance camera (hereafter, referred to as a camera) as an image pickup apparatus that is Embodiment 1 of the present invention.

Objects such as cars 102, a house 103, trees 104, and a road 105 are contained in a shot image. Reference numeral 106 denotes an evaluation area (hereafter, referred to as an evaluation frame) where an AF evaluation value and a white balance evaluation value that are evaluation information used for performing an autofocus process (AF) or an automatic color adjustment process (AWB) based on an image signal. The evaluation frame 106 for the AF is the same as that for the AWB, but the evaluation frames 106 for the AF and the AWB may also be set differently from each other.

Figure 2:
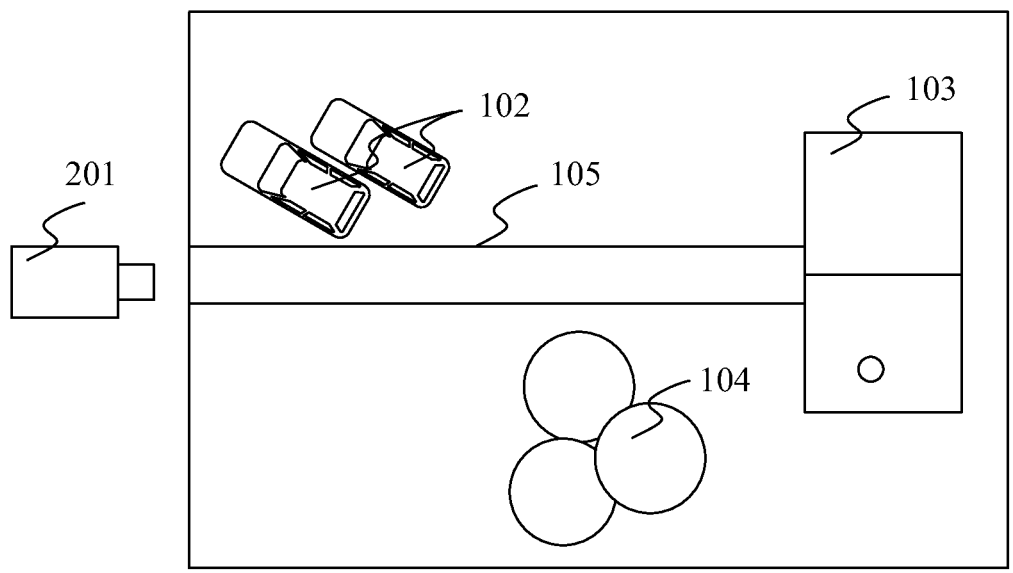
FIG. 2 is a view illustrating a position relation of objects in the shot image illustrated in FIG. 1.

FIG. 2 illustrates a position relation (a distance relation) of a camera 201 and the objects 102 to 105 contained in the shot image illustrated in FIG. 1. The cars 102 are located at a position nearest to the camera 201 except for the road 105, and the trees 104 and the house 103 are away from the camera 201 in this order. The road 105 extends from a position near the camera 201 compared with the cars 102 to the house 103.

Figure 3:
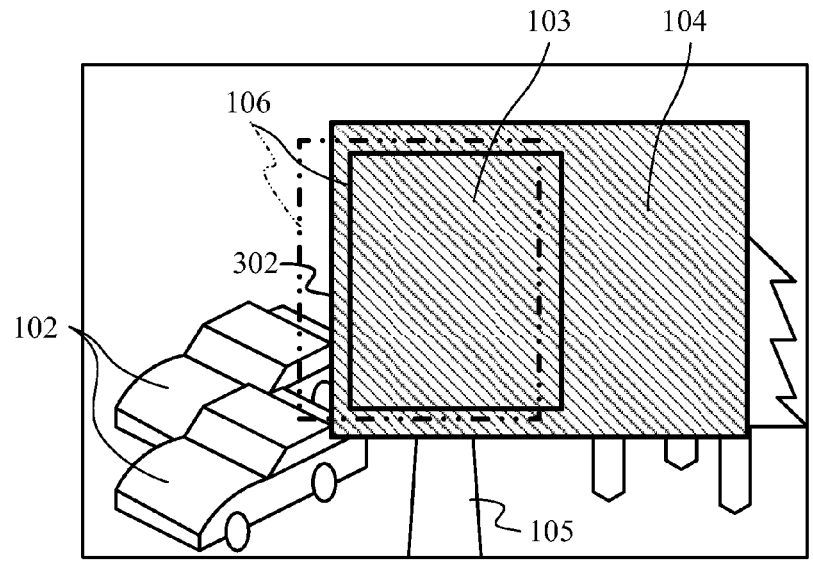
FIG. 3 is a view illustrating a case where a mask area is overlapped with an evaluation area in the shot image.

FIG. 3 illustrates an example of a case where a mask area 302 is overlapped with the evaluation frame 106 in the shot image.

Figure 4:
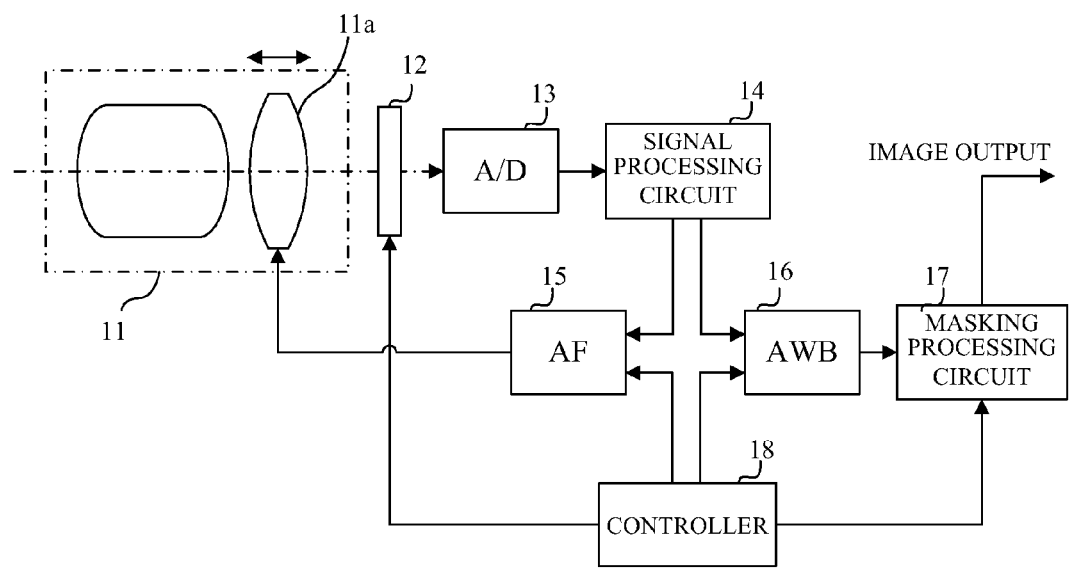
FIG. 4 is a block diagram illustrating a configuration of the camera in Embodiment 1.

The camera of the present embodiment is constituted as illustrated in FIG. 4. The camera forms an image based on a light from the object in the shot image using an image pickup optical system 11, and converts the object image formed by the imaging into an electric signal using an image pickup element 12 that is a photoelectric conversion element such as a CCD sensor or a CMOS sensor. The electric signal outputted from the image pickup element (the analog image pickup signal) is converted into a digital image pickup signal by an A/D converter 13 to be inputted to a signal processing circuit 14. The signal processing circuit 14 performs various kinds of signal processing for the inputted digital image pickup signal to generate an image signal (i.e. image).

Reference numeral 18 denotes a controller that is constituted by a CPU and the like, which controls the image pickup element 12 or operations of an AF processing circuit 15, an AWB processing circuit 16, and a masking processing circuit 17 described below. The AF processing circuit 15, the AWB processing circuit 16, and the controller 18 constitute an adjustment processor, and the masking processing circuit 17 and the controller 18 constitute a masking processor.

The AF processing circuit 15 extracts a high-frequency component from the image signal in the evaluation frame 106 of the image signals that constitute the image (hereafter, referred to as a shot image) generated as described above, and generates (obtains) an AF evaluation value that indicates a contrast state of the shot image based on the high-frequency component. Then, a focus lens 11a in the image pickup optical system 11 is moved in an optical axis direction so that the AF evaluation value is maximized to perform the focusing of the object (the specific object) in the evaluation frame 106. In FIG. 3, a case where the evaluation frame 106 is set so as to include the house 103 and the AF is performed for the house 103 is illustrated.

The AWB processing circuit 16 obtains a white balance evaluation value as a color signal value of RGB from the image signal of a white part in the evaluation frame 106 of the image signals constituting the shot image. Then, it calculates a gain value of the RGB for displaying a predetermined white color in an output image based on the white balance evaluation value, and performs a white balance process using the gain value for the shot image.

The masking processing circuit 17 performs a masking process (a process that superimposes a black or gray image) in a mask area 302 in the shot image for which the white balance process has been performed to prevent the object in the mask area 302 from being displayed in the output image from the camera. FIG. 3 illustrates a case where the mask area 302 is set so as to mask the house 103 and a part of the trees 104. In other words, FIG. 3 illustrates a case where the road 105 and the cars 102 are objects to be monitored by the output image of the camera.

However, FIG. 3 illustrates a case where the mask area 302 is overlapped with the whole of the evaluation frame 106 or it is overlapped with a part (a major part) of the evaluation frame 106 as indicated by a dashed-two dotted line. In this case, the AF is performed for the house 103 that is not displayed by the masking process, and an output image in which a monitored object (the cars 102) that has an object distance different from that of the house 103 is blurred is obtained.

Figure 5:
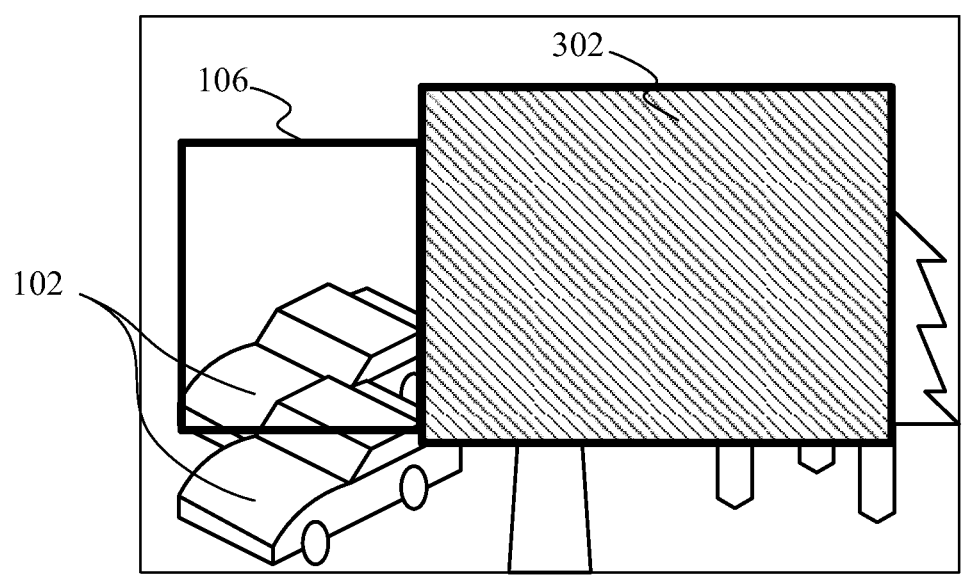
FIG. 5 is a view illustrating a state in which the evaluation area is moved to a position where the evaluation area is not overlapped with the mask area in Embodiment 1.

When a condition as illustrated in FIG. 3 is obtained in the camera of the present embodiment, the position of the evaluation frame 106 is changed to a position that is not overlapped with the mask area 302 as illustrated in FIG. 5. In other words, when the mask area 302 is overlapped with at least a part of the evaluation frame 106, the position of the evaluation frame 106 is changed so as to increase a range where the evaluation frame 106 is not overlapped with the mask area 302. In this case, the change is performed so as to minimize a changing amount of the position of the evaluation frame.

Figure 6:
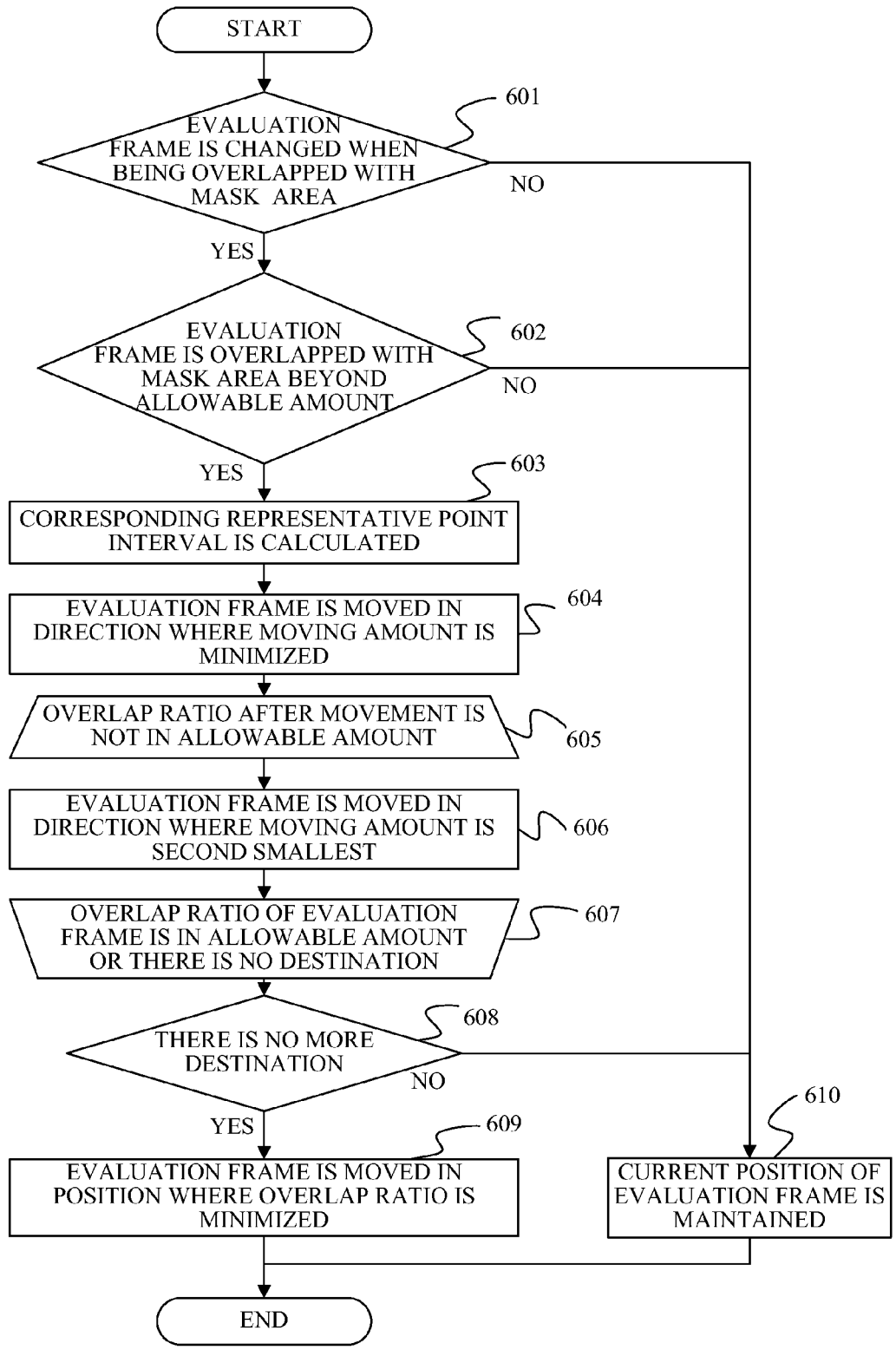
FIG. 6 is a flowchart illustrating a process of changing the evaluation area in the camera of Embodiment 1.

The flowchart of FIG. 6 illustrates a flow of the process that changes the position of the evaluation frame 106. The process is performed by the controller 18 in accordance with a computer program.

First of all, in step 601, the controller 18 determines whether or not a process that changes the position of the evaluation frame is performed (an evaluation frame changing process) when the mask area is overlapped with the evaluation frame. Whether or not the evaluation frame changing process is performed is previously set by a user of the camera. When the evaluation frame changing process is performed, the controller 18 proceeds to Step 602. On the other hand, when the evaluation frame changing process is not performed, the controller 18 proceeds to Step 610 to maintain the current position of the evaluation frame.

In Step 602, the controller 18 determines whether or not the mask area is overlapped with the evaluation value beyond a predetermined allowable amount (a predetermined amount). This is a determination for excluding an object in an area that is not covered with a mask before the AF or AWB is performed from a target of the evaluation frame changing process. The extent to which the mask area is overlapped with the evaluation frame can be calculated as follows.

Figure 8:
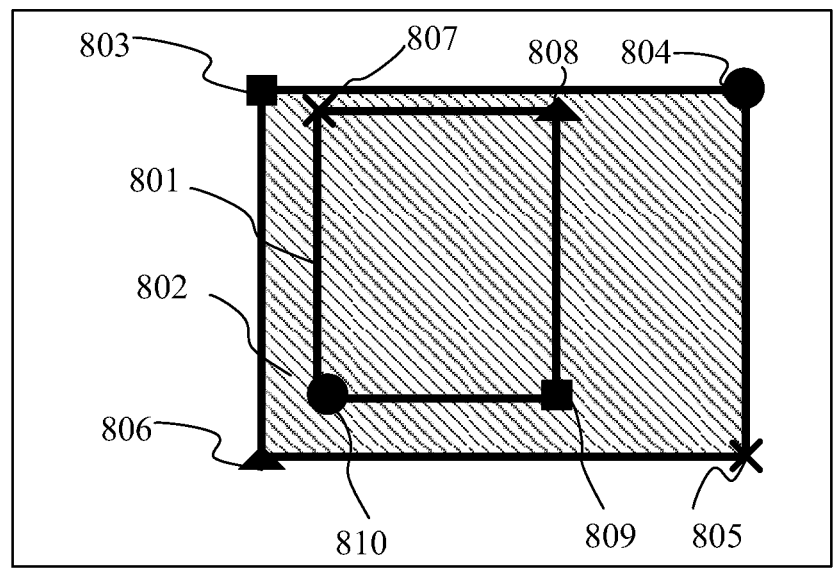
FIG. 8 is a view illustrating a setting example of representative points of the evaluation area and the mask area in Embodiment 1.

FIG. 8 illustrates a case where both an evaluation frame 801 and a mask area 802 have rectangular shapes. The controller 18 obtains an area of an overlapped range (the whole of the evaluation frame 801 in FIG. 8) in which the evaluation range 801 is overlapped with the mask area 802, and calculates an overlap ratio that indicates a ratio of the area of the overlapped range to the area of the evaluation frame 801. Then, whether or not the overlap ratio exceeds an allowable value (for example, 50%) that corresponds to the allowable amount is determined in Step 602.

Figure 7:
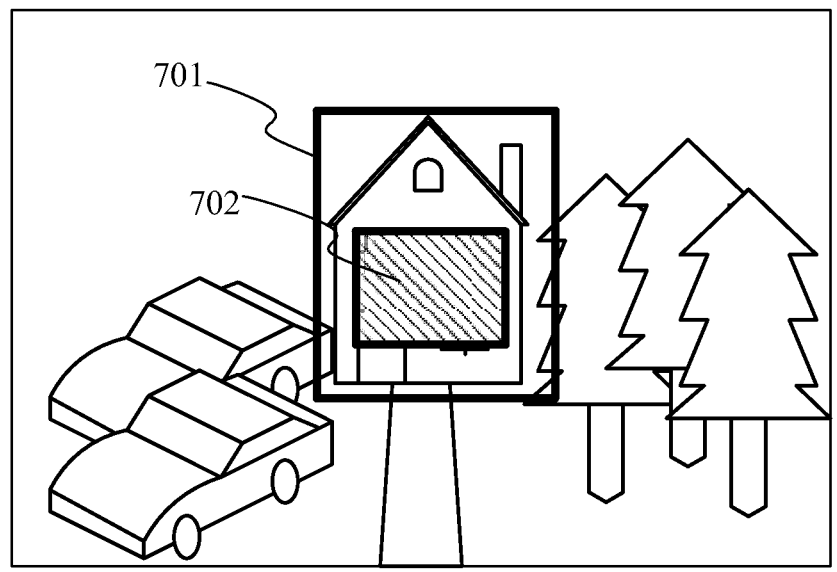
FIG. 7 is a view illustrating a case where the evaluation area is overlapped with the mask area and its overlap ratio is equal to or less than an allowable amount in Embodiment 1.

As illustrated in FIG. 8, when the evaluation frame 801 is overlapped with the mask area 802 beyond the allowable value, the controller 18 proceeds to Step 603. On the other hand, as illustrated in FIG. 7, when the evaluation frame 701 is not overlapped with the mask area 702 beyond the allowable value (the overlap ratio is equal to or less than the allowable value), the controller 18 proceeds to Step 601 to maintain the current position of the evaluation frame.

In Step 603, as illustrated in FIG. 8, the controller 18 sets a representative point in each of the evaluation frame 801 and the mask area 802. For example, when the evaluation frame 801 and the mask area 802 have rectangular shapes, each vertex may be set as the representative point (X points 807 and 805, black triangular points 808 and 806, black square points 809 and 803, and black circle points 810 and 804). Both the representative points having the same mark such as the X mark or the black circle mark are referred to as corresponding representative points. In FIG. 8, both the corresponding representative points of the evaluation frame 801 and the mask area 802 are set so as to be positioned opposite to each other in a horizontal direction and a vertical direction.

Then, the controller 18 calculates a length of the corresponding representative points of the evaluation frame 801 and the mask area 802, for example a length in the horizontal direction (in a predetermined direction) between the black circle points 810 and 804 (hereinafter, referred to as a corresponding representative point interval).

The controller 18 obtains the shortest interval of the corresponding representative point intervals calculated as described above. In FIG. 8, the interval in the horizontal direction between the black triangular points 808 and 806 and the interval in the horizontal direction between the black square points 809 and 803 are the shortest.

Then, the controller 18 moves the evaluation frame in a direction where the shortest corresponding representative point interval becomes shorter by a predetermined amount in Step S604. As a result, a moving amount of the evaluation frame is minimized and the overlapped range of the mask area in the evaluation frame (the overlap ratio) can be reduced or disappear, i.e. the range in which the evaluation frame is not overlapped with the mask area can be increased.

Next, in step 605, the controller 18 determines whether or not the overlap ratio of the mask area in the evaluation frame after the movement exceeds the allowable value. The case where the overlap ratio of the moved evaluation frame exceeds the allowable value is for example a case where the moving amount of the evaluation frame cannot be sufficiently ensured by an end of the shot image.

When the overlap ratio exceeds the allowable value, the controller 18 moves the evaluation frame by a predetermined amount in a direction where the moving amount to decrease the overlap ratio of the mask area is the second smallest in Step 606. The controller 18 repeats the processes of Steps 605 and 606 until it is determined that the overlap ratio is equal to or less than the allowable value in Step 607. In this case, the evaluation frame may also be moved in a direction where the corresponding representative point interval which is the shortest in a vertical direction or an oblique direction becomes shorter.

Then, in Step 607, the controller 18 determines whether the overlap ratio of the mask area in the evaluation frame after the movement is equal to or less than the allowable value or the overlap ratio cannot be decreased to equal to or less than the allowable value even if the processes of Steps 605 and 606 are repeated by the predetermined number of times (i.e. there is no more destination).

In Step 608, when the determination result in Step 607 is "there is no more destination", the controller 18 proceeds to Step 609. In Step 609, the controller 18 repeats the processes of Steps 605 and 606 by the predetermined number of times, and sets the evaluation frame to a position where the overlap ratio is minimized.

On the other hand, when the determination result in Step 607 is "the overlap ratio is equal to or less than the allowable value", the controller 18 proceeds to Step 610 to maintain the current position of the evaluation frame (i.e. the position where the overlap ratio is equal to or less than the allowable value). As a result, the evaluation frame 106 whole of which is overlapped with the mask area 302 as illustrated in FIG. 3 can be moved to the position where the evaluation frame 106 is not overlapped with the mask area 302 as illustrated in FIG. 5.

Therefore, the subsequent AF or AWB is performed for the cars 102 in the moved evaluation frame 106, and the focusing is performed for the cars 102 and the road 105 near the cars 102, and an output image whose colors are appropriately adjusted can be obtained.

Embodiment 2

Figure 9:
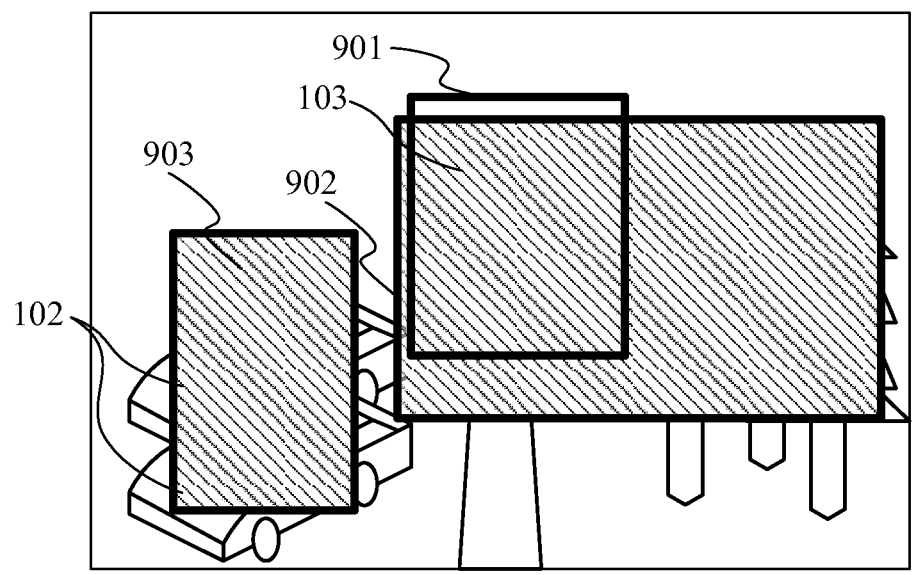
FIG. 9 is a view illustrating a case where a plurality of mask areas are set in Embodiment 2 of the present invention.

Referring to FIG. 9, a case where a plurality of mask areas are set in a shot image will be described as Embodiment 2 of the present invention.

In FIG. 9, the focusing is performed by AF for the house 103 included in an evaluation frame 901, but a major part of the evaluation frame 901 is overlapped with a mask area 902 and the house 103 is not displayed. In FIG. 9, two mask areas 902 and 903 that cover the house 103 and the cars 102 respectively are set in the shot image. In the present embodiment, the position of the evaluation frame 901 is changed to a non-mask area other than the mask areas 902 and 903.

Figure 10:
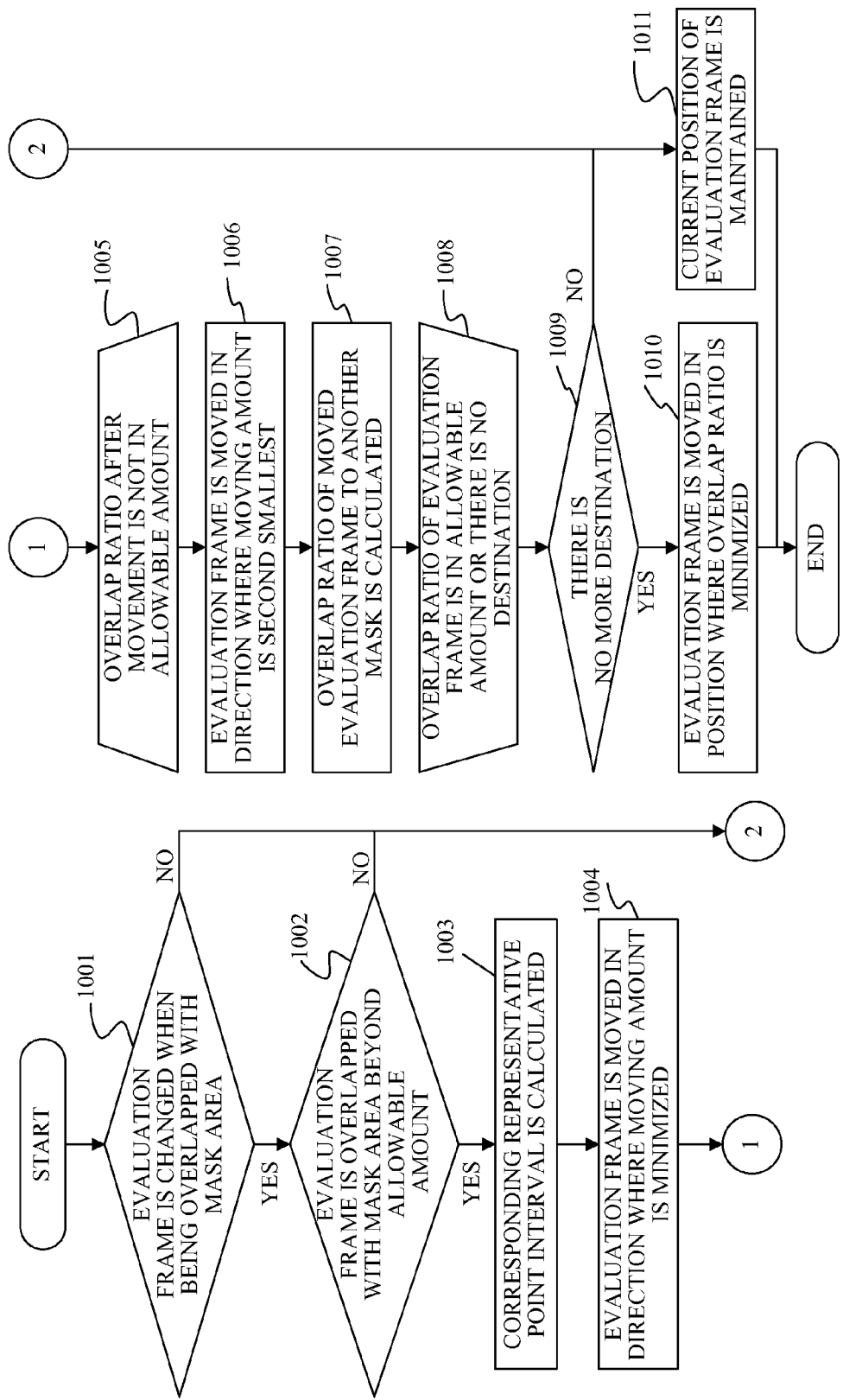
FIG. 10 is a flowchart illustrating a process of changing the evaluation area in a camera of Embodiment 2.

FIG. 10 illustrates a flow of a process that changes the position of the evaluation frame 901 in the present embodiment. This process is performed by the controller 18 in accordance with a computer program.

First of all, in Step 1001, the controller 18 determines whether or not the evaluation frame changing process that changes the position of the evaluation frame in a case where the evaluation frame is overlapped with the mask area similarly to Step 601 of Embodiment 1. Whether or not this evaluation frame changing process is performed is previously set by a user of the camera. When the evaluation frame changing process is performed, the controller 18 proceeds to Step 1002. On the other hand, when the evaluation frame changing process is not performed, the controller 18 proceeds to Step 1011 to maintain the current position of the evaluation frame.

In Step 1002, the controller 18 determines whether or not the evaluation frame is overlapped with the mask area by an amount more than a predetermined allowable amount, similarly to Step 602 of Embodiment 1. When the evaluation frame is overlapped with the mask area by an amount more than the predetermined allowable amount (the overlap ratio exceeds an allowable value), the controller 18 proceeds to Step 1003. On the other hand, the evaluation frame is not overlapped with the mask area by an amount more than the predetermined allowable amount (the overlap ratio is equal to or less than the allowable value), the controller 18 proceeds to Step 1011 to maintain the current position of the evaluation frame.

Figure 11:
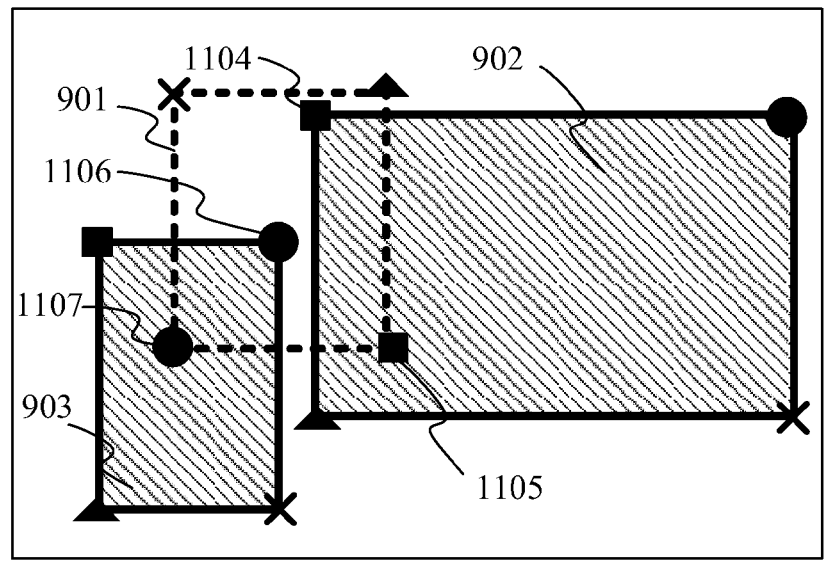
FIG. 11 is a view illustrating a setting example of representative points of the evaluation area and the mask area in Embodiment 2.

In Step 1003, the controller 18 sets a representative point in each of the evaluation frame and the mask area. FIG. 11 illustrates a setting example of the representative points in a case where an evaluation frame 901 and mask areas 902 and 903 have rectangular shapes (however, the position of the evaluation frame 901 in FIG. 11 is a position after the evaluation frame 901 in FIG. 9 is moved in Step 1004 described below). In FIG. 11, the corresponding representative points of the evaluation frame 901 and the mask areas 902 and 903 are set so as to be positioned at opposite sides to each other in a horizontal direction and a vertical direction.

The controller 18 calculates an interval in the horizontal direction (a corresponding represent point interval) between the corresponding representative points of the evaluation frame and one of the mask areas which has the higher overlap ratio of the evaluation frame (it corresponds the mask area 902 in FIG. 9, and hereinafter referred to as a first mask area). Then, the shortest interval of the calculated corresponding representative point intervals is obtained.

Next, in Step 1004, the controller 18 moves the evaluation frame by a predetermined amount in a direction where the shortest corresponding representative point interval becomes shorter.

As a result, a moving amount of the evaluation frame is minimized and the overlapped range of the first mask area in the evaluation frame (the overlap ratio) can be reduced or disappear, i.e. the range in which the evaluation frame is not overlapped with the first mask area can be increased.

Next, in Step 1005, the controller 18 determines whether or not the overlap ratio of the first mask area in the evaluation frame after the movement exceeds the allowable amount. As a case where the overlap ratio of the evaluation frame after the movement exceeds the allowable value, for example there is a case where the moving amount of the evaluation frame cannot be sufficiently ensured by the end of the shot image.

When the overlap ratio exceeds the allowable value, the controller 18, in Step 1006, moves the evaluation frame by a predetermined amount in a direction where the moving amount to decrease the overlap ratio of the first mask area is the second smallest.

The controller 18, in Step 1007, calculates the overlap ratio of the other mask area (it corresponds to the mask area 903 in FIG. 11, and hereinafter referred to as a second mask area) in the evaluation frame after the movement. This is because the overlap ratio of the second mask area may exceed the allowable value in some cases even if the overlap ratio of the first mask area in the evaluation frame is equal to or less than the allowable value. In some cases, the evaluation frame may also be overlapped with both the first and second mask areas and as a result a total of the overlap ratios may exceed the allowable value.

The controller 18, in Step 1008, repeats the processes of Steps 1005 to 1007 until it is determined that both the overlap ratio of the evaluation frame for each of the first and second mask areas and the total of the overlap ratios for both the first and second mask areas are equal to or less than the allowable value. In this case, the evaluation frame may also be moved in a direction where the representative point interval that is the shortest in the vertical direction or the oblique direction becomes shorter.

Then, in Step 1008, the controller 18 determines whether each of the above overlap ratios is equal to or less than the allowable value or each of the overlap ratios cannot be decreased to equal to or less than the allowable value even if the processes of Steps 1005 to 1007 are repeated by a predetermined number of times (i.e. there is no more destination).

In Step 1009, when the determination result in Step 1008 is "there is no more destination", the controller 18 proceeds to Step 1010. In Step 1010, the controller 18 repeats the processes of Steps 1005 to 1007 by a predetermined number of times to set the evaluation frame to a position where the total of the overlap ratios of the first and second areas is minimized.

On the other hand, when the determination result in Step 1008 is "the overlap ratio is equal to or less than the allowable amount", the controller 18 proceeds to Step 1011 to maintain the current position of the evaluation frame (the position where the total of the overlap ratios is equal to or less than the allowable amount).

Figure 12:
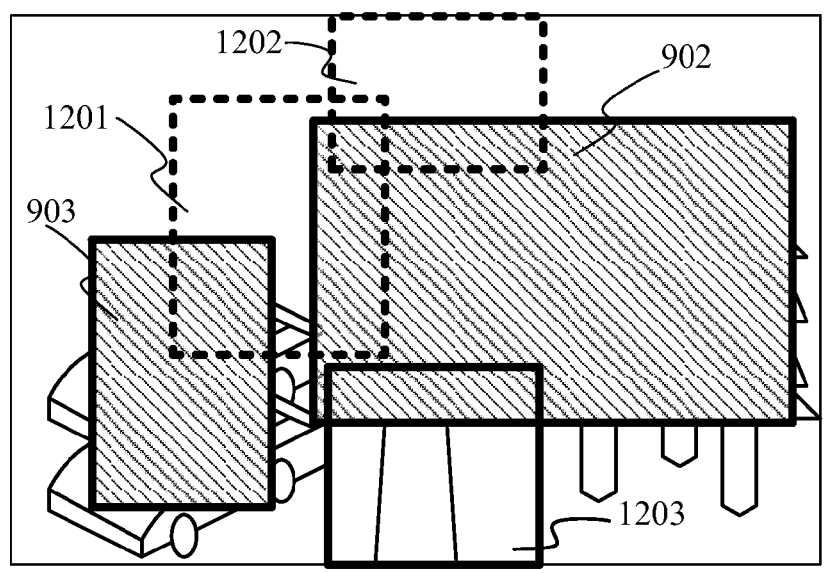
FIG. 12 is a view illustrating an example in which the evaluation area is changed in Embodiment 2.

As a result, the evaluation frame 901, a major part of which is overlapped with the first mask area 902 as illustrated in FIG. 9 can be moved to a position where it is overlapped with a small part of the mask area 902 as illustrated in FIG. 12.

In FIG. 12, reference numeral 1201 denotes a position as a first destination candidate of the evaluation frame in Step 1004 described above, and reference numeral 1202 denotes a second destination candidate. Furthermore, reference numeral 1203 denotes a position as a third destination candidate. At the position 1201, the evaluation frame is overlapped with both the two mask areas 902 and 903, and the total of the overlap ratios exceeds the allowable value. At the position 1202, a part of the evaluation frame is overlapped with only the mask area 902, but the evaluation frame is protruded from an upper end of the shot image and the effective size of the evaluation frame is reduced. As a result, the overlap ratio of the mask area 902 exceeds the allowable value.

Then, at the position 1203, a part of the evaluation frame is overlapped with only the mask area 902 and the evaluation frame is protruded from a lower end of the shot image, but the effective size of the evaluation frame does not become small so much and the overlap ratio for the mask area 902 is equal to or less than the allowable value. Therefore, finally the evaluation frame is set to the position 1203.

Therefore, the subsequent AF or AWB is performed for the road 105 after the movement, and the focusing is performed for the road 105 and an output image whose color around the road 105 has been appropriately adjusted can be obtained.

Embodiment 3

Figure 13:
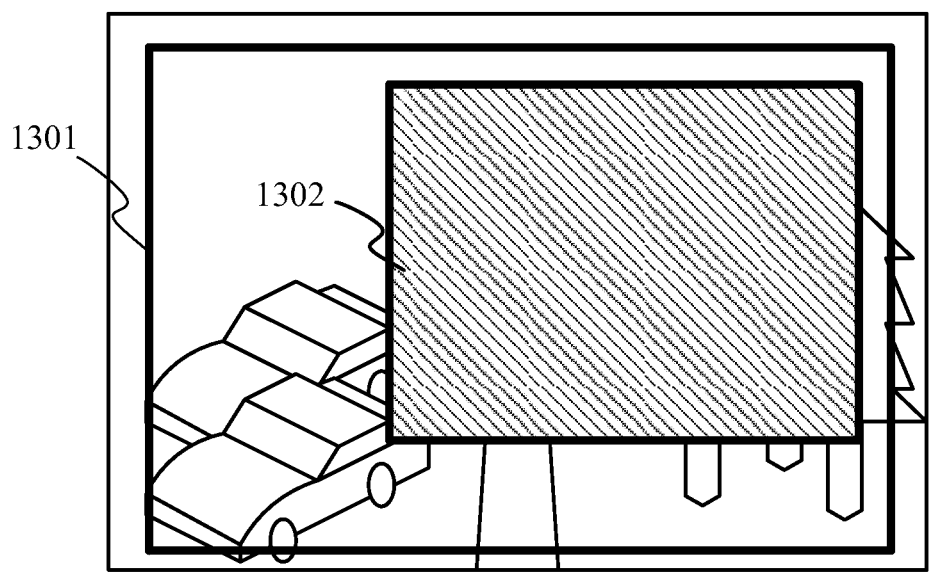
FIG. 13 is a view illustrating an example in which the evaluation area is changed in Embodiment 3 of the present invention.

In Embodiments 1 and 2 described above, a case where the position of the evaluation frame is changed to prevent the evaluation frame from being overlapped with the mask area beyond the allowable amount is described. On the other hand, in the present embodiment, the size of the evaluation frame is changed (extended) from the state illustrated in FIG. 3 as illustrated in FIG. 13 to prevent the evaluation frame from being overlapped with the mask area beyond the allowable amount (the overlap ratio exceeds the allowable value). Furthermore, in the present embodiment, a changing amount of the size of the evaluation frame is set to be small as much as possible.

Figure 14:
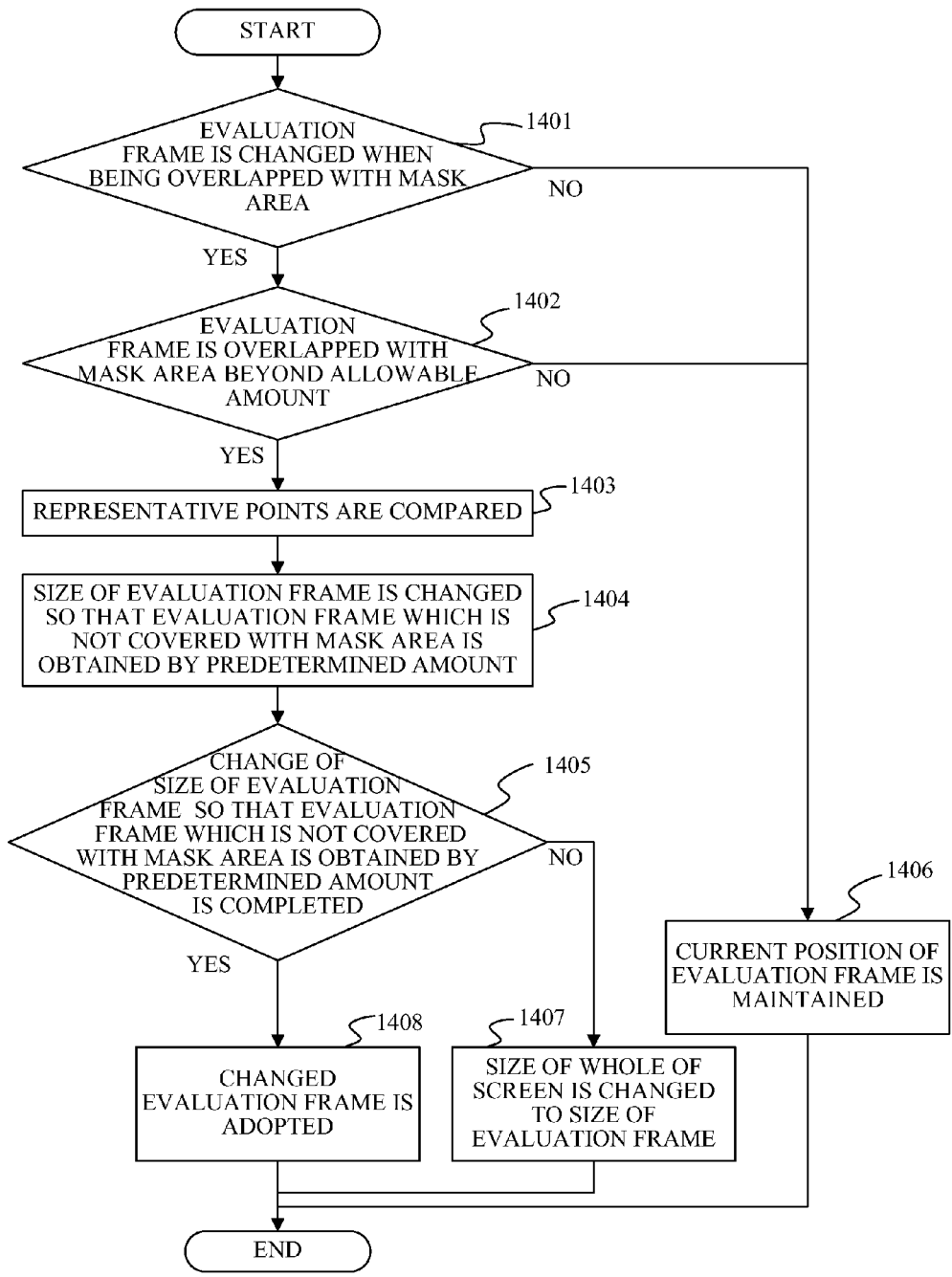
FIG. 14 is a flowchart illustrating a process of changing the evaluation area in a camera that is Embodiment 3.

FIG. 14 illustrates a flow of a process that changes the position of the evaluation frame 901 in the present embodiment. This process is performed by the controller 18 in accordance with a computer program.

First of all, in Step 1401, the controller 18 determines whether or not an evaluation frame changing process that changes the size of the evaluation frame is performed when the evaluation frame is overlapped with the mask area. Whether or not the evaluation frame changing process is performed is previously set by a user of the camera. When the evaluation frame changing process is performed, the controller 18 proceeds to Step 1402. On the other hand, the evaluation frame changing process is not performed, the controller 18 proceeds to Step 1406 to maintain the current size (and the current position) of the evaluation frame.

In Step 1402, the controller 18 determines whether or not the evaluation frame is overlapped with the mask area beyond a predetermined allowable amount similarly to Step 602 of Embodiment 1. When the evaluation frame is overlapped with the mask area beyond the allowable amount (the overlap ratio exceeds the allowable value), the controller 18 proceeds to Step 1403. On the other hand, the evaluation frame is not overlapped with the mask area beyond the allowable amount (the overlap ratio is equal to or less than the allowable value), the controller 18 proceeds to Step 1406 to maintain the current size (and the current position) of the evaluation frame.

In step 1403, the controller 18 sets a representative point in each of the evaluation frame and the mask area similarly to Step 1003 of Embodiment 1. Then, the controller 18 compares the representative point of the evaluation frame with the representative point of the mask area to calculate the minimum size of the evaluation frame in which the overlap ratio for the mask area can be equal to or less than the allowable value (i.e. a non-mask area that has a size equal to or larger than a predetermined amount is obtained).

Then, in Step 1404, the controller 18 changes the size of the evaluation frame so as to obtain the size calculated in Step 1403. As a result, while an expanding amount of the evaluation frame is suppressed to be minimized, the overlapped range (the overlap ratio) of the evaluation frame for the mask area can be reduced, i.e. the range where the evaluation frame is not overlapped with the mask area can be increased, and therefore the non-mask area that has an amount equal to or larger than the predetermined amount can be ensured.

Next, in Step 1405, the controller 18 determines whether or not the overlap ratio of the evaluation frame for the mask area could be finally reduced to a value equal to or less than the allowable value (i.e. whether or not the non-mask area having the size equal to or larger than the predetermined amount could be obtained) as a result of the expansion of the evaluation frame in Step 1404. When the overlap ratio could be reduced to the value equal to or less than the allowable value, the controller 18 proceeds to Step 1408 to set the evaluation frame that has the changed size. On the other hand, when the overlap ratio could not reduced to the value equal to or less than the allowable value, the controller 18 proceeds to Step 1407 to set the evaluation frame to the size nearly equal to the whole of the shot image.

Therefore, the subsequent AF or AWB is performed for the cars 102 or the road 105 in the evaluation frame whose size has been changed, and the focusing is performed for the cars 102 or the road 105 and an output image whose color has been appropriately adjusted can be obtained.

When the size of the evaluation frame is changed, the position of the center of the evaluation frame may also be changed.

As described above, in each of the above embodiments, at least one of the position and the size of the evaluation frame is changed to reduce the overlap ratio of the evaluation frame for the mask area to a value equal to or less than the allowable value. As a result, a state where the focusing is performed for an object that is not displayed by being included in the mask area to blur other objects or an output image for which an inappropriate color adjustment has been performed based on a color of the nondisplayed object is obtained can be prevented. In other words, the focusing is performed for the object that is included in the non-mask area other than the mask area to be displayed, and therefore an output image for which the color of the object has been appropriately adjusted can be obtained.

Moreover, in each of the above embodiment, since at least one of the position and the size of the evaluation frame is changed so that its changing amount (the moving amount or the expanding amount) is reduced as much as possible, a new evaluation frame can be set in a range which is close as much as possible to the evaluation frame before the change. However, this is only one example of the way to change at least one of the position and the size of the evaluation frame, and any changing way may also be applied if a range that is not overlapped with the mask area in the evaluation frame is increased. For example, the position or the size of the evaluation frame after the change may also be set previously.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-062057, filed on Mar. 18, 2010 which is hereby incorporated by reference herein in its entirety.

What is claimed is:

1. An image pickup apparatus that generates an image by taking the image, the image pickup apparatus comprising:
   an adjustment processor configured to set an evaluation area in the image and to perform a focusing process or a color adjustment process based on evaluation information obtained from an image signal of the evaluation area; and
   a masking processor configured to set a mask area in the image and to perform a masking process for the mask area,
   wherein the adjustment processor automatically changes at least one of a position and a size of the evaluation area so that a range in which the evaluation area is not overlapped with the mask area increases in a case that a range in which the evaluation area is overlapped with the mask area is larger than a permissible size.

2. The image pickup apparatus according to claim 1, wherein the adjustment processor changes at least one of the position of the size of the evaluation area so that the range in which the evaluation area is not overlapped with the mask area increases until a range in which the evaluation area is overlapped with the mask area falls within a permissible size.

3. The image pickup apparatus according to claim 1, wherein the adjustment processor determines whether a plurality of mask areas set by the masking processor are overlapped with at least a part of the evaluation area.

4. The image pickup apparatus according to claim 1, wherein the evaluation information indicates the contrast state of the image.

5. The image pickup apparatus according to claim 1, wherein the evaluation information indicates a high frequency component of the image.

6. The image pickup apparatus according to claim 1, wherein the evaluation information indicates a white balance evaluation value of the image.

7. A method for generating an image, the method comprising:
   setting an evaluation area in a taken image;
   performing a focusing process or a color adjustment process based on evaluation information obtained from an image signal of the evaluation area;
   setting a mask area in the image;
   performing a masking process for the mask area; and
   automatically changing at least one of a position and a size of the evaluation area so that a range in which the evaluation area is not overlapped with the mask area increases in a case that a range in which the evaluation area is overlapped with the mask area is larger than a permissible size.

8. An image pickup apparatus that generates an image by taking the image, the image pickup apparatus comprising:
   an adjustment processor configured to set an evaluation area in the image and to perform a focusing process or a color adjustment process based on evaluation information obtained from an image signal of the evaluation area; and
   a masking processor configured to set a mask area in the image and to perform a masking process for the mask area,
   wherein the adjustment processor automatically controls at least one of a position and a size of the evaluation area so that a range in which the evaluation area is not overlapped with the mask area increases in a case that a range in which the evaluation area is overlapped with the mask area is larger than a permissible size.

9. The image pickup apparatus according to claim 8, wherein the adjustment processor changes at least one of the position of the size of the evaluation area so that the range in which the evaluation area is not overlapped with the mask area increases until a range in which the evaluation area is overlapped with the mask area falls within a permissible size.

10. An image pickup apparatus that generates an image by taking the image, the image pickup apparatus comprising:
    an adjustment processor configured to set an evaluation area in the image and to perform a focusing process or a color adjustment process based on evaluation information obtained from an image signal of the evaluation area; and
    a masking processor configured to set a mask area in the image and to perform a masking process for the mask area,
    wherein the adjustment processor automatically controls at least one of a position and a size of the evaluation area so that the evaluation area which is not overlapped with the mask area increases in a case that a range in which the evalutaion area which is overlapped with the mask area is larger than a permissible size.

11. A method for generating an image, the method comprising the steps of:

setting an evaluation area in a taken image;
performing a focusing process or a color adjustment process based on evaluation information obtained from an image signal of the evaluation area;
setting a mask area in the image;
performing a masking process for the mask area; and
automatically controlling at least one of a position and a size of the evaluation area so that a range in which the evaluation area is not overlapped with the mask area increases in a case that a range in which the evaluation area is overlapped with the mask area is larger than a permissible size.

12. A method for generating an image, the method comprising the steps of:
setting an evaluation area in a taken image;
performing a focusing process or a color adjustment process based on evaluation information obtained from an image signal of the evaluation area;
setting a mask area in the image;
performing a masking process for the mask area; and
automatically controlling at least one of a position and a size of the evaluation area so that the evaluation area which is not overlapped with the mask area increases in a case that a range in which the evaluation area is overlapped with the mask area is larger than a permissible size.

* * * * *